(12) United States Patent
Totale et al.

(10) Patent No.: US 10,097,622 B1
(45) Date of Patent: Oct. 9, 2018

(54) METHOD AND SYSTEM FOR COMMUNICATION USING PUBLISHED EVENTS

(71) Applicant: EMC Corporation, Hopkinton, MA (US)

(72) Inventors: Sachin Gopaldas Totale, Pleasanton, CA (US); Naveen K. Vidyananda, Bangalore (IN); Jobin John, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 355 days.

(21) Appl. No.: 14/851,499

(22) Filed: Sep. 11, 2015

(51) Int. Cl.
*H04L 29/08* (2006.01)
*G06F 9/54* (2006.01)

(52) U.S. Cl.
CPC .............. *H04L 67/10* (2013.01); *H04L 67/02* (2013.01); *H04L 67/26* (2013.01); *G06F 9/542* (2013.01); *G06F 9/546* (2013.01)

(58) Field of Classification Search
CPC ...................................................... G06F 9/542
See application file for complete search history.

(56) References Cited

U.S. PATENT DOCUMENTS

| | | | | |
|---|---|---|---|---|
| 6,122,639 | A * | 9/2000 | Babu | H04L 12/12 |
| 6,829,770 | B1 * | 12/2004 | Hinson | G06F 9/542 |
| | | | | 719/318 |
| 7,177,859 | B2 * | 2/2007 | Pather | G06F 9/542 |
| 7,181,490 | B1 * | 2/2007 | Harvey | H04L 67/26 |
| | | | | 709/203 |
| 7,559,065 | B1 * | 7/2009 | Sosnovsky | G06F 9/542 |
| | | | | 719/318 |
| 7,676,812 | B2 * | 3/2010 | Cabrera | H04L 12/1895 |
| | | | | 709/207 |
| 7,698,276 | B2 * | 4/2010 | Seshadri | G06Q 30/02 |
| | | | | 719/318 |
| 8,341,646 | B2 * | 12/2012 | Bornhoevd | G06Q 10/10 |
| | | | | 719/318 |
| 9,086,935 | B2 * | 7/2015 | Budai | G06F 9/542 |
| 2006/0088014 | A1 * | 4/2006 | Ganesh | H04W 4/00 |
| | | | | 370/338 |
| 2007/0027996 | A1 * | 2/2007 | Stewart | H04L 67/34 |
| | | | | 709/230 |
| 2007/0168420 | A1 * | 7/2007 | Morris | G06F 9/542 |
| | | | | 709/204 |
| 2007/0217420 | A1 * | 9/2007 | Raj | H04L 45/00 |
| | | | | 370/392 |
| 2007/0282914 | A1 * | 12/2007 | Sivapragasam ... | G06F 17/30578 |
| 2007/0299979 | A1 * | 12/2007 | Houri | G06Q 10/00 |
| | | | | 709/230 |
| 2008/0134202 | A1 * | 6/2008 | Craggs | G06F 9/542 |
| | | | | 719/313 |

(Continued)

*Primary Examiner* — Jimmy H Tran
(74) *Attorney, Agent, or Firm* — Chamberlain Hrdlicka

(57) ABSTRACT

A method and system for communication using published events. Specifically, the disclosed method and system entail implementing a publication-subscription paradigm to enable communication event exchange in a device-independent manner. The publication-subscription paradigm may also enable communication event exchange in real-time, thereby avoiding web traffic intensive polling that often leads to server-overloading.

17 Claims, 9 Drawing Sheets

(56) References Cited

U.S. PATENT DOCUMENTS

| | | | |
|---|---|---|---|
| 2008/0208953 A1* | 8/2008 | Tian | H04L 67/24 709/201 |
| 2008/0256553 A1* | 10/2008 | Cullen | G06Q 30/02 719/313 |
| 2010/0250677 A1* | 9/2010 | Kahan | H04L 12/1859 709/204 |
| 2011/0045845 A1* | 2/2011 | Balasaygun | G06F 9/543 455/456.1 |
| 2012/0016986 A1* | 1/2012 | Jacquet | H04L 47/10 709/224 |
| 2012/0259894 A1* | 10/2012 | Varley | G06F 17/30575 707/795 |
| 2012/0284331 A1* | 11/2012 | Kambatla | G06Q 10/06 709/204 |
| 2013/0198654 A1* | 8/2013 | Jones | H04L 65/403 715/753 |
| 2015/0135197 A1* | 5/2015 | Budai | G06F 9/542 719/315 |
| 2017/0104826 A1* | 4/2017 | Sait | G05B 19/41855 |
| 2017/0199923 A1* | 7/2017 | Prabhakaran Nair | G06F 17/30575 |

* cited by examiner

US 10,097,622 B1

METHOD AND SYSTEM FOR COMMUNICATION USING PUBLISHED EVENTS

BACKGROUND

A web application is a software application that executes in a web browser. The web application may include one or more functionalities that enable a user of the web application to send communication events to other users and/or systems.

DETAILED DESCRIPTION

Figure 1A:
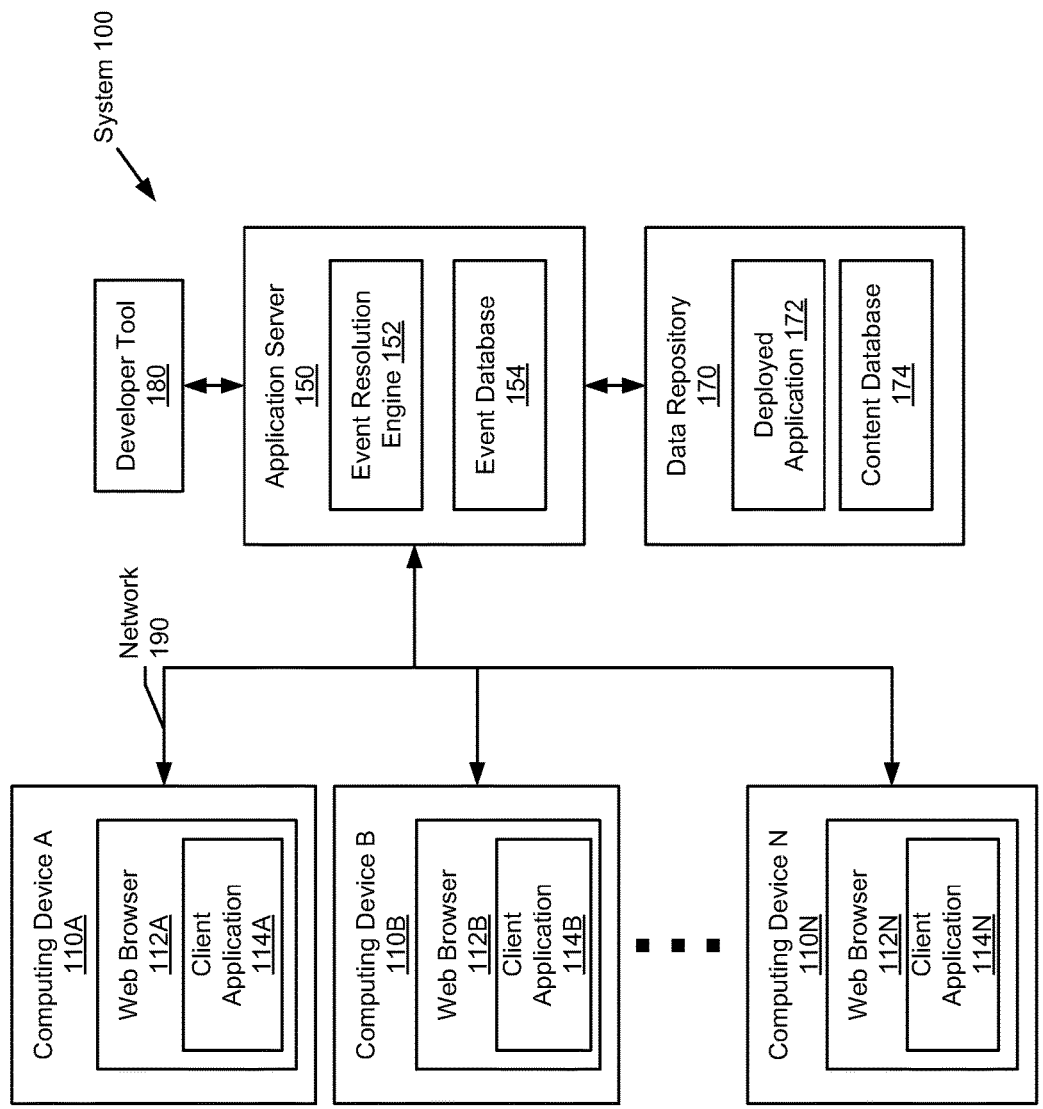
FIGS. 1A-1C show systems in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to methods and systems enabling users of web browser-based applications or components of the web browser-based application to communicate with other users and/or systems. The methods may be employed in distributed systems, where users may access central and/or distributed resources, e.g., data storage, from a client application (e.g. a web browser-based application), via an application server. A distributed system may be, for example, an enterprise content management (ECM) or an enterprise resource planning (ERP) system, where users may access content from the central and/or distributed data storage. Communications in the distributed system may include, for example, impromptu chat sessions between users and technical support, transmission of online status information from/to other users, collaborative wiki pages, discussion forums, peer-to-peer content sharing, etc.

In one or more embodiments of the technology, these communications may be performed via user interface events whose properties are modified. User interface events may be used to enable a user of a client application to influence the execution of functionalities of the client application and/or the application server. A user interface event may have a limited scope, e.g. a scope enabling the user interface event to affect the execution of local code, e.g. within the client application, within a particular page of the client application, within a functionality or fragment of a functionality provided by the application client, etc. A user interface event may be connected to a user interface input element. A user interface input element may be any type of web page element of the client application accepting input from a user accessing the application. A user interface input element may be, for example, a pushbutton, a user menu, a dialog box, etc. A user's action (e.g., a user pushing the pushbutton, a user selecting a menu option, etc.) may be recognized, and as a result, actions may be performed as specified by the configuration of the user interface event and by business rules whose execution may be triggered and/or controlled by the user interface event. For example, a user may enter an address of a new customer in a user interface element and the user interface event, connected to the user interface element, may trigger the execution of a functionality that obtains the newly entered address and that then automatically populates a letter template, displayed by the web page, with the customer information.

In one or more embodiments of the technology, the properties of the user interface events may be modified to provide a global scope, i.e., rather than being limited to causing and/or performing actions locally, e.g. within a client application, a user interface event with a global scope may cause actions elsewhere, i.e., outside the client application. A user interface event with a global scope may therefore, for example, be available in other client applications, operated by other users. Accordingly, a user interface event with a global scope may serve as a communication event for conveying a message from one client application to another client application. A communication event, which, in accordance with one or more embodiments of the technology, is a user interface event with global scope, may be used for any type of communication between users of a client application, via the client applications, for communications of functionalities of the client applications themselves, and for communications with other connected components of the system, such as the application server serving the client applications. Those skilled in the art will appreciate that a communication event is not limited to supporting a particular type of communication. A communication event may rather serve as a universally applicable vehicle for conveying information. Communication events and user interface events may have similar structures and the steps for configuring these events may be similar, but in contrast to user interface events, communication events may have a global scope, as previously discussed. Communication events may serve many different purposes, and the purpose of a specific communication event may be determined by the configuration of the communication event, by the input provided to the communication event (for example, by what data is provided to the communication event by a user interface input element), and by the configuration of the receiving side of the communication event (for example, by whether a received communication event may be provided to a user, whether it may serve as an input to a business rule or to a system process, etc.).

The following examples illustrate potential applications of user interface events that are not global: (1) A web page load event that causes a data service to update the back end system. The web page load event may be used, for example, to automatically update an attendance record when an employee opens the web page. (2) A text box in a web page that updates another text box when data in the text box is updated. (3) Clicking a button in a web page causes the navigation to a particular page/to particular content. The above described examples have in common that they may be limited to entities of a single user's session of a software application.

The following examples illustrate potential applications of communication events that are global: (1) A chat client application that enables conversations between users. (2) A collaborative editing feature that enables users to work on a document as a team. (3) Real-time updating of a dashboard page for all logged-in users without requiring user interaction. The above described examples for communication events have in common that they may not be limited to a local scope. Instead, these communication events may reach multiple users of a software application.

The above described examples are intended to only serve illustrative purposes. The technology is not limited to these examples.

In one or more embodiments of the technology, communication events are handled using a publication/subscription paradigm. A client application may publish, i.e., send a communication event to be published to the application server serving the client applications. The application server may determine the qualified recipients of the communication event to be published (e.g., users that have successfully subscribed to the communication event), and may subsequently deliver the communication event to the qualified recipients via the client applications they are using.

FIG. 1A shows a schematic diagram of a system in accordance with one or more embodiments of the technology. Specifically, FIG. 1A shows a schematic diagram of a system (100) enabling users of web browser-based applications to communicate with other users and/or systems. As shown in FIG. 1A, the system may include computing devices A-N (110A-110N), an application server (150), a data repository (170) and a developer tool (180). Each of these components is described in detail below.

In one or more embodiments of the technology, the application (including the application server and client applications) may implement business rules. Business rules may be logical statements and/or expressions used to support an organization's workflow by automating and facilitating business processes. A business process may be an activity or a set of activities that accomplish an organization goal. A business process that may be automated is, for example, the creation of invoices, based on recent business transactions, and the sending of these invoices to the customers. In general, business rules may be used to determine whether and how data stored in a data repository (170) of the system (100) may be accessed and how it may be manipulated, thus governing how a user may interact with the data.

User may interact with the business rules via user interface input elements that enable a user to provide input, and via user interface output elements that enable the displaying of business process outputs (i.e., the results of applying the business rule(s) to the input) to the user.

Business rules may involve the communication with other parties, e.g., other users. For example, the user performing above-described invoicing may request assistance from another user in order to process an international transaction. Communication events may thus be used in context of business rules to enable such communications. The web page that the user accesses may therefore include one or more additional user interface events with a global scope (i.e., events capable of being disseminated to other components of the system rather than being limited to a local scope).

Similar communication functionalities may be used by components of the system for communicating with other components of the system or for notifying users. For example, a system administrator may automatically be notified, when a user login attempt is detected.

As previously described, the system (100), in accordance with one or more embodiments of the technology, includes one or more computing devices (110A-110N). A computing device may be similar to the exemplary computing device shown in FIG. 7, and may be any type of mobile, desktop, server, embedded, or other hardware capable of performing at least one of the steps described below with reference to FIGS. 2A-6. The computing device may be connected to a network (190) (e.g., a local area network (LAN), a wide area network (WAN) such as the Internet, mobile network, or any other type of network) via a network interface connection (not shown), thereby enabling the computing device to communicate with other computing devices (110A-110N) and the application server (150).

Continuing with the discussion of the system (100), shown in FIG. 1A, in one or more embodiments of the technology, the computing devices (110A-110N) may have executing thereon web browsers (112A-112N). A web browser may provide a platform for the execution of a client application (114A-114N), which may be displayed to the user of the computing device as one or more web pages. The web browser may be a software application for retrieving, presenting and traversing content resources (e.g. documents formatted and annotated with hypertext markup language (HTML), JavaScript, Cascading Style Sheets (CSS), and any language and/or any other language extensions necessary for executing the client application (114A-114N)).

In one or more embodiments of the technology, the web browsers (112A-112N) may host client applications (114A-114N). A client application may be web browser-executable code (including, e.g., HTML, JavaScript and/or CSS elements), that provides a user interface enabling a user to access and/or manipulate data stored in a content database (174) in the data repository (170), via the application server (150), described in detail below. Access to data and user interface behavior may be governed by business rules that may be implemented by the browser-executable code of the client application and/or by code of the application server (150). In one or more embodiments of the technology, the client application or elements of the client application may be custom-built by a developer, using the developer tool (180), described below. After a developer has built a client application, the client application, which includes application pages and application code, may be stored in the data repository (170) as a deployed application (172). The web browser (112A-112N), executing on the computing device (110A-110N), may connect to the application server to obtain the deployed application (172) when a user initiates use of the web application (114A-114N). The web browser may then execute the received deployed application as the client application.

In one or more embodiments of the technology, the client application may include components and functionality enabling a user to send and/or receive communication events, as described below, with reference to FIGS. 1B-6.

Continuing with the discussion of FIG. 1A, the system (100), in accordance with one or more embodiments of the technology, includes the application server (150). The web browsers (112A-112N) may connect to the application server to enable users to access the content database (174), and to process and manipulate data in the content database in accordance with business rules. The application server may be executing on a computing device similar to the exemplary computing device shown in FIG. 7. The computing device executing the application server may include physical or virtual server hardware including at least a processor, memory, persistent storage, and a communication interface. The application server (150) may be on-premises, operated by the legal entity (e.g. the company) providing, using and/or administrating the system (100). Alternatively, the application server may be hosted by a third party, e.g., in a datacenter. Further, the application server may be cloud-based, e.g. the application server may provide its services as a software as a service (Saas). Although a single application server (150) is shown in FIG. 1, components of the application server may be distributed over multiple computing devices, either locally or remotely. The application server may be connected to a network (190) (e.g., a local area network (LAN), a wide area network (WAN) such as the Internet, mobile network, or any other type of network) via a network interface connection (not shown), thereby enabling the application server to communicate with the computing devices (110A-110N), the data repository (170) and/or distributed components of the application server.

In one or more embodiments of the technology, the application server (150) includes modules that perform at least one of the steps described below with reference to FIGS. 2A-6. More specifically, the application server includes an event resolution engine (152) and an event database (154).

In one or more embodiments of the technology, the event resolution engine (152) includes functionality to enable the application server (150) to receive communication events from client applications (114A-114N) executing in web browsers (112A-112N) on computing devices (110A-110N). The event resolution engine may be capable of resolving recipients that are qualified to receive the communication event, based on information included in the communication event and based on information retrieved from the event database (154), before providing the communication event to the qualified recipient. The details of the steps performed by the event resolution engine (152) are provided below, with reference to FIGS. 4B and 6. The event resolution engine (152) may be a software module of the application server, or it may be an independent software component that interfaces with the application server.

In one or more embodiments of the technology, the event database (154), described below with reference to FIG. 1C, stores information provided by client applications that have subscribed to communication events. The event database (154) may be implemented using any format suitable for the storage of entries made for communication events to which client applications have subscribed. The event database may be, for example, a text file, a spreadsheet, an SQL database, etc. or any other type of hierarchical, relational and/or object oriented collection of data. The event database may be stored in non-volatile or volatile memory, e.g. on a hard disk drive or in RAM. Accordingly, the implementation of the event database is not limited to any particular data structure or any particular storage medium.

Continuing with the discussion of FIG. 1A, the system (100), in accordance with one or more embodiments of the technology, includes the data repository (170). The data repository may store the deployed application (172) and the content database (174). The data repository may be any type of non-volatile storage, including, for example, a hard disk drive, a redundant array of independent disks (RAID), network attached storage (NAS), cloud storage, etc. Further, at least some of the content of the data repository may alternatively or in addition be stored in volatile memory, e.g., in RAM.

The deployed application (172), in accordance with one or more embodiments of the technology, includes the resources that, when loaded and executed by a web browser (112A-112N), may form the client application (114A-114N). The deployed application may include, for example, HTML, JavaScript and CSS instructions that define appearance and function of the client application. In one or more embodiments of the technology, the deployed application may have been built and subsequently stored in the data repository by a developer using the developer tool (180). In one or more embodiments of the technology, the deployed application and/or the configuration of the deployed application may change when communication events are added to the application, as described below with reference to FIGS. 2A and 2B, when communication events are edited, and when communication events are removed from the application.

The content database (174), in accordance with one or more embodiments of the technology, stores content that may be business-relevant. The content database may, for example, store inventories, sales figures, technical drawings audio files, video files, images, metadata, health records, social media posts, text documents, and any other type of structured and/or unstructured data that users may access in accordance with the business rules governing the access. Accordingly, depending on the nature of data to be stored, the content database may be any type of hierarchical, relational and/or object oriented collection of data, including formats suitable for the storage and retrieval of unstructured data. The content database may be stored in non-volatile or volatile memory, e.g. on a hard disk drive or in RAM.

As previously noted, the system (100), in accordance with one embodiment of the technology, further includes the developer tool (180). The developer tool may be used by an application designer to custom-build a client application (114A-114N). The developer tool may enable the application designer to design the webpage(s) of the client application, for example, by dragging and dropping user interface widgets such as, for example, text boxes, graphs, figures, menus, tool bars, icons, links, etc., into the page editor of the developer tool. Subsequently, these user interface elements, inserted into the web pages, may be connected to business rules via user interface events, for example to manipulate data, e.g., data located in the content database (174). For example, a push button "obtain sales totals" on the web page may be linked to expressions that sum up all individual sales for a particular year. The user name of the user making the request to obtain sales totals may provide context that may affect the execution of the expressions. For example, if user A is logged on, only sales by user A may be considered, if user B is logged on, only sales by user B may be considered, whereas all sales by all users may be considered if the vice president of sales is logged on. The expressions may be located in the application code, and may be, for example, JavaScript code. The developer tool (180) may allow an application designer to perform previously described steps using a graphical design and programming environment. Accordingly the application designer may not need to have coding skills.

Analogous to above-described user interface events, communication events with a global scope may be added to the web page of the application in order to enable users to communicate in various ways with various systems (or components therein). Communication events may be implemented to be accessible via input and output elements of the web page and may be incorporated in the context of business processes (i.e., they may become available in a context-dependent manner, as useful and/or necessary to perform a task) using graphical programming, without requiring coding.

Once the developer has completed the development, application pages and application code may be deployed in the data repository (170), thus enabling users to load the deployed application (172) into a web browser (112A-112N), where it may form the client application (114A-114N).

The components of the system (100), i.e., the computing devices A-N (110A-110N), the application server (150), the data repository (170) and the developer tool (180) may communicate using any combination of wired and/or wireless communication protocols. In one embodiment of the technology, the computing devices, the application server, the data repository and the developer tool communicate via a wide area network (190) (e.g., over the Internet), and/or a local area network (e.g., an enterprise or home network). The communication between the components of the system (100) may include any combination of secured (e.g., encrypted) and non-secured (e.g., un-encrypted) communication. The manner in which the components of the system communicate may vary based on the implementation of the technology.

Figure 1B:
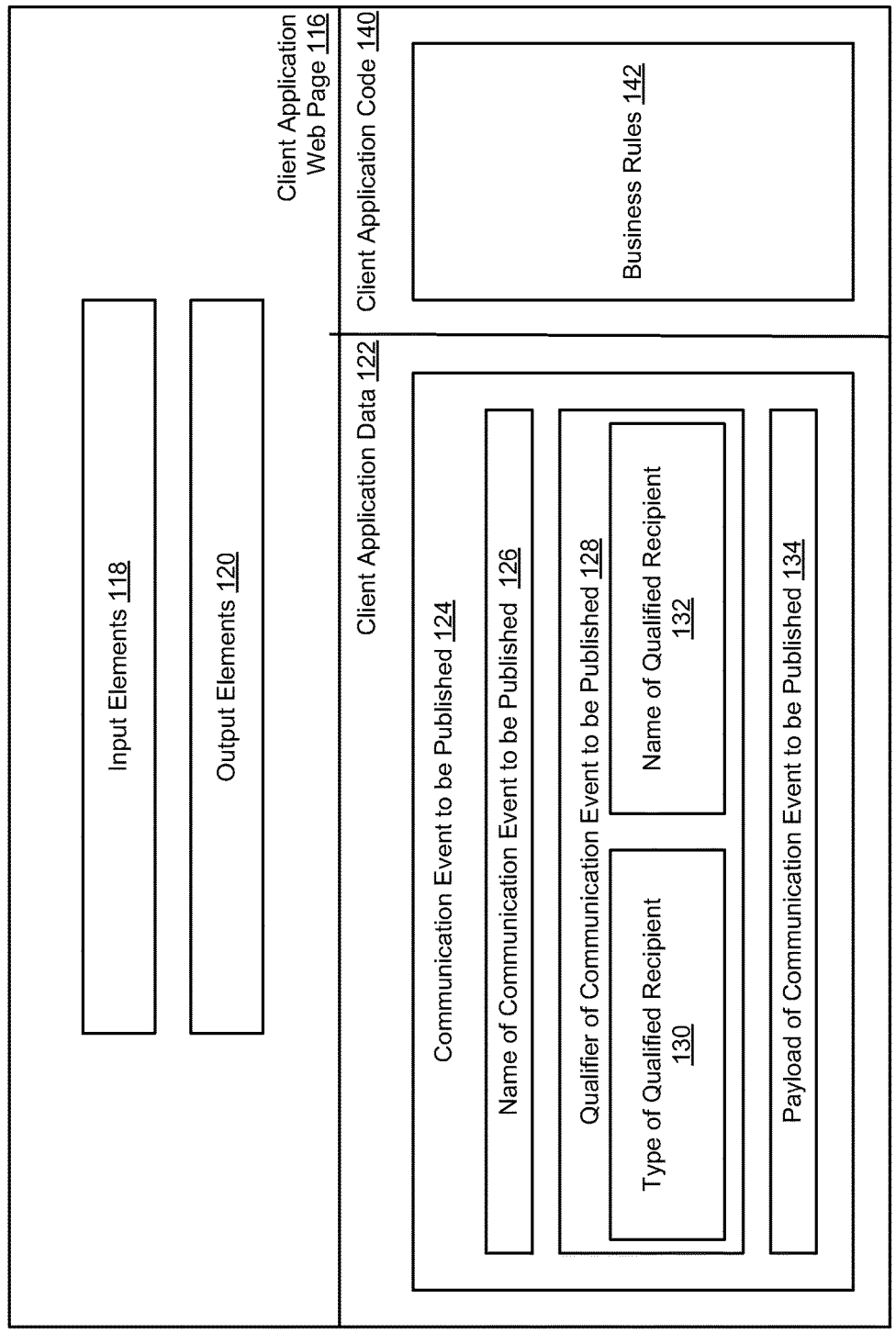

FIG. 1B shows a schematic diagram of a client application in accordance with one or more embodiments of the technology. Specifically, FIG. 1B shows a schematic diagram of a client application (114) enabling a user interacting with the client application to send and receive communication events in accordance with business rules applying to the communication events. For example, a chat window may become available when the users accesses a technical support page, or a notification may be sent by the client application to the system administrator when the user attempts to connect to a certain resource such as an access-protected database.

As shown in FIG. 1B, the client application may include a client application page (116), client application data (122) and client application code (140). The client application page (116) may include input elements (118) and output elements (120). The client application data (122) may include one or more communication events (124). The client application code (140) may include business rules (142). The client application page (116), the client application data (122) and the client application code (140) may be interdependent. Each of these components and their interactions are described below.

In one or more embodiments of the technology, the client application page (116) is a webpage, displayed in a web browser window. The client application page may be a user interface for displaying content, e.g. business-relevant content obtained from the content database (174). Content may be displayed using output elements (120). The output elements may be, for example, text boxes, graphs, figures, videos, etc. Output to a user may further be provided as audio output. The client application user interface may be used for enabling a user to interact with the displayed content and/or to request different content. The client application page may thus include input elements (118), enabling the user to provide input to the client application (114). These input elements may include, for example, buttons, sliders, lists of options, menus, tool bars, icons, links, text boxes, etc. Further, hybrid input/output elements may combine input and output functionality, thus enabling a user to interact (i.e. provide input) with displayed content (the output) using a single input/output element. In general, the input elements (118) and output elements (120) may be of any type supported by the web browser (112A-112N), either directly or using web browser extensions, plugins, etc. In one or more embodiments of the technology, one or more of the input and/or output elements, described above, may be used to send and/or receive a communication event. For example, a text box may be available to accommodate user input for a chat function, check boxes may be available to capture a user's selection of options to be communicated to the application server and/or to other users, popup windows may be available to display the content of a communication event received from another user, etc.

In one or more embodiments of the technology, the client application code (140) includes computer-executable instructions for: rendering the client application page (116), for providing output received from, for example, the application server (150) to the output elements (120), and for receiving and processing information provided by the user via the input elements (118). The client application code (140) may include, for example, HTML, CSS and JavaScript instructions. In one or more embodiments of the technology, the client application code (140) further includes instructions for subscribing to communication events published by other client applications. The client application code (140) may also include instructions for receiving published communication events and for displaying content of the published events via the output elements (120) of the client application page (116). The client application code (140) may further include computer-executable instructions for obtaining input provided by a user via input elements (118) of the client application page (116) and for creating a communication event to be published (124), based on the user input, and for publishing the communication event to be published (124) to the application server (150). The details of generating, publishing and subscribing to communication events are described below with reference to FIGS. 2A-6.

In one or more embodiments of the technology, the communication event to be published (124) may be maintained by the client application (114) as client application data (122). The communication event to be published (124) may be a data structure that includes the information necessary for publishing (i.e. sending) the communication event. The communication event to be published may include a name of the communication event to be published (126), a qualifier of the communication event to be published (128), and a payload (134). Each of these components is described below.

The name of the communication event to be published (126), in accordance with an embodiment of the technology, serves as an identifier for the communication event to be published. The name of the communication event to be published may be, for example, a descriptive string that may include characters or numbers. A name of a communication event to be published may be, for example, "notify_admin". The name of the communication event to be published may have been chosen by the application designer during the development of the client application. In one or more embodiments of the technology, globally valid and unique names may be used, thus enabling the application server (150), and client applications (114A-114N) to uniquely identify a communication event to be published (124) based on the name of the communication event to be published (126).

The qualifier of the communication event to be published (128), in accordance with an embodiment of the technology, specifies the recipient(s) qualified to receive the communication event to be published (124). The qualifier of the communication event to be published (128) may include a type of qualified recipient (130) and/or a name of a qualified recipient (132).

The type of the qualified recipient (130) may be an identifier, for example, a descriptive string that may be used to characterize the type of the recipient qualified to receive the communication event to be published (124). Types of qualified recipients may include, for example: "user", "user group", "role" (e.g., technical support, accounting, administrator, etc.), "web page", "device", "location", "data service", "business rule", and functionalities, e.g., "chat widget", etc. Those skilled in the art will appreciate that the technology is not limited to the aforementioned types of qualified recipients.

The name of a qualified recipient (132) may be used to specify the name of the recipient qualified to receive the communication event to be published (124). For example, for a qualified recipient of the type "user", a name of a qualified recipient may be "Peter".

In one or more embodiments of the technology, the qualifier for the communication event to be published (128) for a particular communication event (124) may include multiple entries for the type of qualified recipients (130) and/or for the names of qualified recipients (132). Multiple entries may be used, for example to qualify multiple recipients e.g., users, devices, etc. as recipients of the communication event to be published. Multiple entries in combination may further be used to limit the recipients considered to be qualified recipients of the communication event. For example, a communication event to be published may be published only to a selected group of users (specified using the qualified recipient type "user") that is relying on a particular type of hardware (specified using the qualified recipient type "device"), for example, in order to distribute a software patch only to a limited group of users that uses hardware compatible with the software patch. In one or more embodiments of the technology, the qualifier of the communication event to be published may be updated at any time, i.e. types of qualified recipients and/or names of qualified recipients may be added and/or removed.

Continuing with the discussion of FIG. 1B, in one or more embodiments of the technology, the communication event to be published (124) further includes the communication event payload (134). The payload may be data to be provided to the qualified recipients of the communication event to be published. The payload may be, for example, a string (e.g., a typed message, a login time, a user name, etc.) or other types of heterogeneous and/or hierarchical data. Hierarchical payload data may be, for example, an employee object that may include an employee ID, a joining date, working hours per week, weekly pay, etc. The employee object may be heterogeneous if the content requires the use of different data types, e.g., for representing numerical data and text data.

In one or more embodiments of the technology, the client application includes business rules (140). The business rules may be logical statements and/or expressions representing rules that govern the behavior of the client application, including the availability of options for sending and receiving communication events. In one embodiment of the technology, business rules may be used to generate and/or modify communication events to be published.

Consider, for example, a scenario, where a business rule exists that specifies that connection attempts to a standard resource are to be logged using a logging service on the application server (150). An additional business rule exists that specifies that connection attempts to an access-protected resource are to be logged, but in addition, the system administrator is to be notified. When a user connects to the standard resource, the business rules may automatically result in the generation a communication event to be published. The communication event to be published may include a type of qualified recipient "service", and the name of the qualified recipient may be "logging", thus indicating that the communication event is directed to the logging service. Further, the business rule may also result in the generation of the communication event payload. The communication event payload may be a string representing the time when the resource access was detected. Next, the user attempts to connect to the access-protected resource. As a result, the business rules may automatically generate a communication event to be published that includes a qualifier for the communication event to be published, with two entries. The first entry may include the type "service" and the name "logging", and the second entry may include the type of qualified recipient "administrator", thus indicating that the communication event is directed to the logging service and to the user to which the role of system administrator was assigned.

Those skilled in the art will appreciate that business rules are not limited to the aforementioned examples. Rather, business rules may include any type of expression, including logical and mathematical expressions that may serve, e.g., automate, accelerate, improve, and/or facilitate, one or more aspects of conducting business using the system (100).

Business rules may be implemented, for example, in JavaScript or any other programming language that is compatible with the web browser, either directly or using web browser extensions.

Figure 1C:
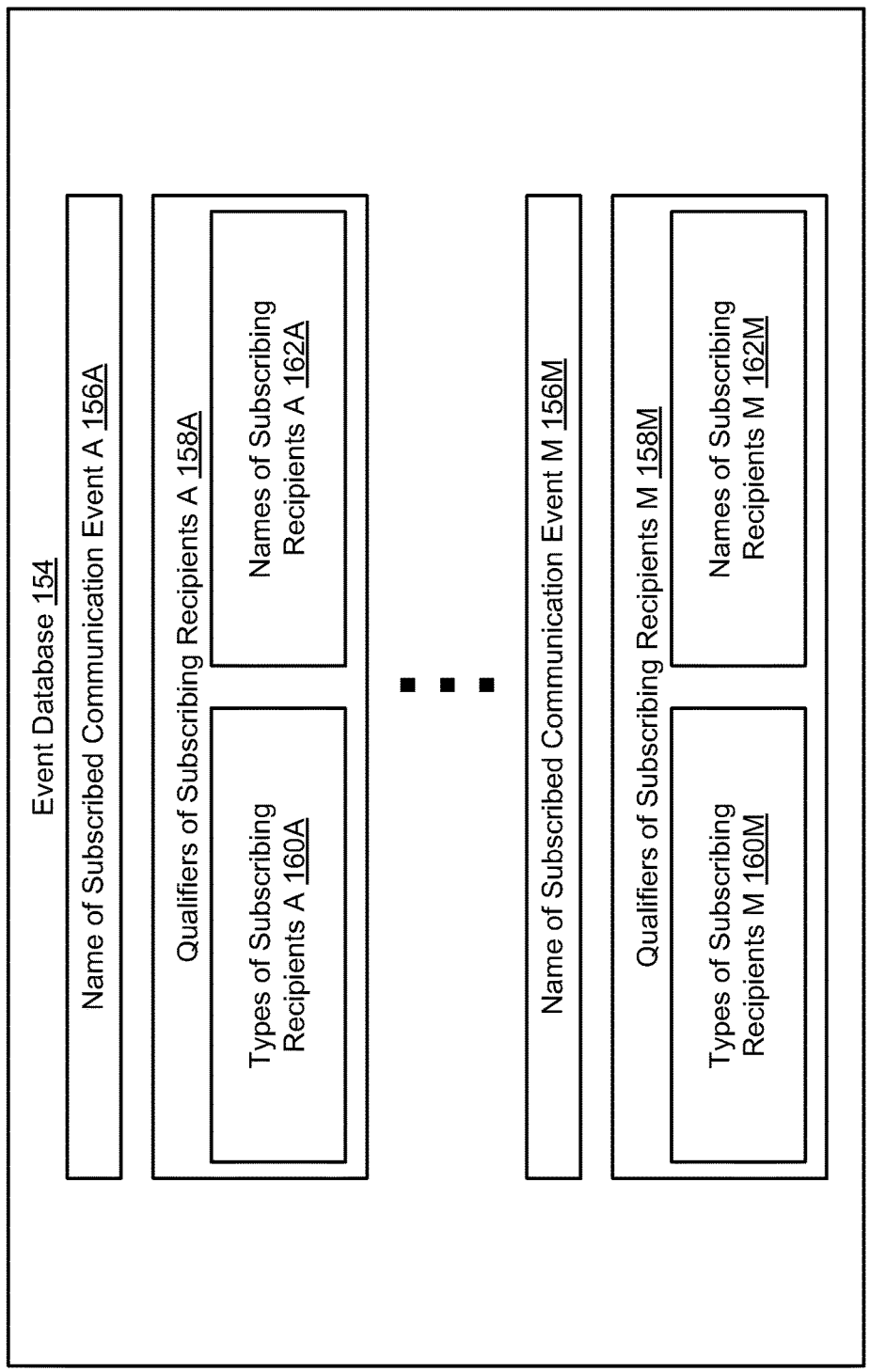

FIG. 1C shows a schematic diagram of the event database (154) of the application server (150). As previously described, the event database stores information provided by subscribing recipients of communication events. The event database may include, for each request to subscribe to a communication event made by a subscribing recipient, a name of the subscribed communication event (156A-156M), and a qualifier of the subscribing recipient (158A-158M).

The name of the subscribed communication (156A-156M), in accordance with an embodiment of the technology, serves as an identifier for the communication event to which the subscribing recipient is subscribing. Similar to the name (126) of the communication event to be published (124), the name of the subscribed communication event may be a descriptive string that may include characters or numbers. The name of the subscribed communication event (156A-156M) may be chosen by the subscribing recipient to match the name (126) of a communication event to be published (124), in order to subscribe to this communication event.

The qualifier (158A-158M) of a subscribed communication event, in accordance with an embodiment of the technology, specifies the subscribing recipient's identity using a type of the subscribing recipient (160A-160M) and a name of the subscribing recipient (162A-162M).

The type (160A-160M) of the subscribing recipient, in accordance with one or more embodiments of the technology, may be an identifier, e.g. a descriptive string that may be used to characterize the type of the subscribing recipient. The types of subscribing recipients may include, for example: "user", "user group", "role" (e.g., technical support, accounting, etc.), "page", "device" (e.g. smartphone, laptop, etc.), "location", "data service". Those skilled in the art will appreciate that the technology is not limited to the aforementioned subscribing recipient types.

The name (162A-162M) of the subscribing recipient, in accordance with one or more embodiments of the technology, may be used to uniquely identify the name of the subscribing recipient. For example, for a subscribing recipient of the type "user", the subscribing recipient name may be "Peter".

In one or more embodiments of the technology, a qualifier (158A-158M) of a subscribing recipient may include either a type (160A-160M) of subscribing recipient, a name (162A-162M) of a subscribing recipient, a type and a name of a subscribing recipient. In one or more embodiments of the technology, multiple qualifiers (158A-158M) of subscribing recipients may exist for a single subscribed communication event, represented by the communication event's name (156A-156M) in the event database (154), in cases where multiple recipients subscribe to the same event. Specific details about recipients subscribing to communication events are provided below with reference to FIGS. 4A and 4B, and specific details about the use of the event database for identifying qualified recipients are provided below with reference to FIG. 6.

One skilled in the art will recognize that the architecture of the system is not limited to the components shown in FIGS. 1A-1C. For example, a client application may handle multiple communication events to be published, and communication events to be published may be generated not only by users, but also by any component of the system, without departing from the technology. Further, not only client applications, but also other components of the system, for example, business rules executing in a client application and/or on the application server may subscribe to communication events, without departing from the technology. The technology is not limited to the data structures shown and/or described in FIGS. 1B and 1C.

Figure 2A:
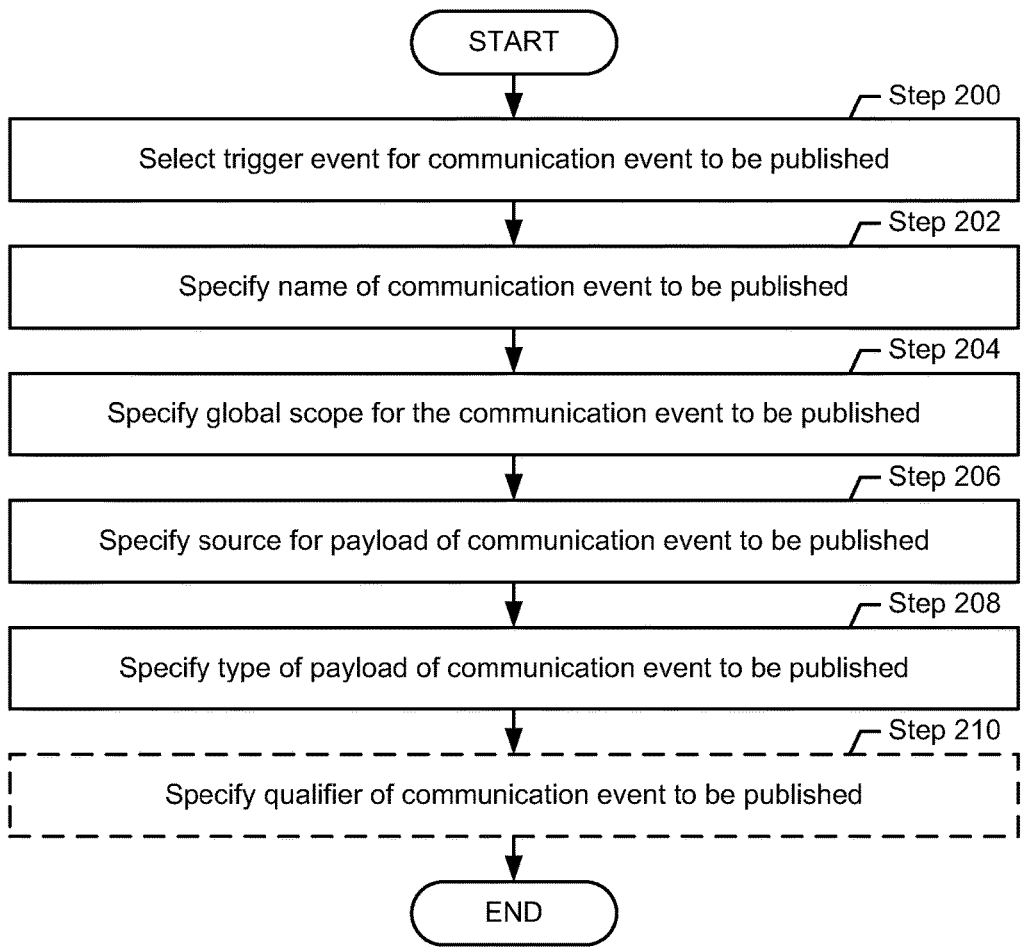
FIGS. 2A-6 show flowcharts in accordance with one or more embodiments of the technology.

FIGS. 2A-6 show methods for communicating using published events. Although FIGS. 2A-6 primarily describe the publishing of communication events to be published by client applications, and the subscription to communication events by other client applications, the technology is not limited to this scenario. Those skilled in the art will recognize that the technology may be used for the communication by any component of a system such as the one previously described with reference to FIGS. 1A-1C with any other component of the system. FIGS. 2A and 2B describe the implementation of the functionalities for communicating using published events in a web application. The implementation may include setting up functionalities that allow a user to send communication events, and functionalities that allow a user to receive communication events. After the implementation in the web application, these functionalities may be made available to the users via the client applications, accessed by the users. FIGS. 3-6 describe the communication using the published events, previously implemented as described in FIGS. 2A and 2B. The communication may occur in real-time (or near-real time), i.e., published events may be provided to qualified recipients of the published events without significant delays.

Figure 2B:
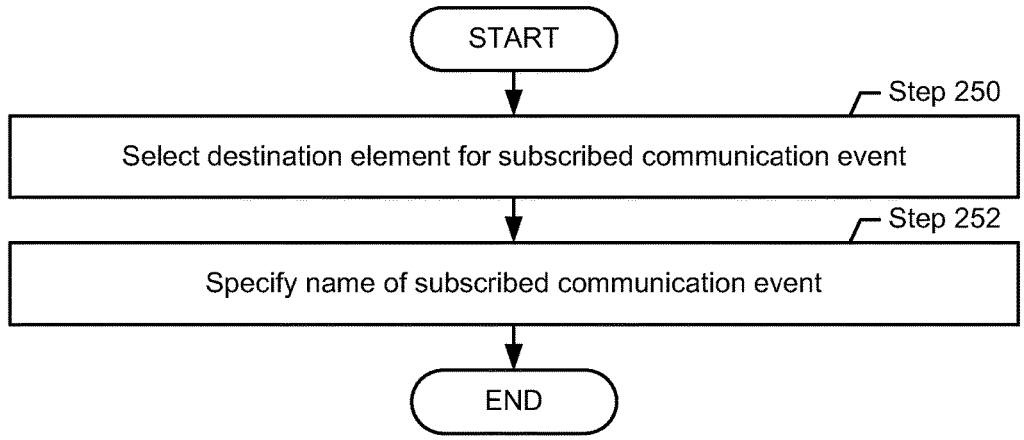

FIGS. 2A and 2B show methods for implementing a method for communicating via communication events in a web application. The implementation may be performed by selecting, placing, configuring and combining multiple elements, used for processing the communication event, in a graphical programming environment. The steps may be performed by an application designer that is familiar with the expression and event infrastructure of the web application. In the expression and event infrastructure in accordance with an embodiment of the technology, events may trigger the manipulation of data (including communication events) based on expressions. Events and expressions may be graphically programmed by the application designer, thus not requiring coding skills. Events may be application internal events or external events (e.g. a user pushing a button on a web page of the web application. Events may trigger the evaluation and/or execution of an expression. For example, pushing a button may trigger the publication of a communication event to be published.

The implementation of the method for communicating via communication events may be performed by selecting graphical user interface elements to be displayed to the user via a web page of the web application, and by parameterizing these graphical user interface elements. For example, the web application designer may select an input element (e.g., a text box, pushbuttons, checkmarks, etc.) to be displayed by a web page of the web application, thus enabling a user of the web application to provide content (e.g. by entering a message to be sent in the text box) for the communication event to be published. The web application designer may also select an output element (e.g. a text box, a display, a chart, etc.) to be displayed by a web page of the client application in order to present the subscribed communication event to a user. In general, the implementation of a communication event may be performed analogous to the implementation of other (not communication related) functionality of the web application, e.g., the implementation of expressions, including business rules, via graphical programming After the selection of input and/or output elements, the capability of publishing and subscribing to communication events via the input and output elements, respectively, may be implemented. The implementation is described below.

In one or more embodiments of the technology, communication events may be used not only by users of the web application, but also by also by the web application itself, enabling different components of the web application, either local or remote, to communicate. In general, the methods described below may enable communication from any type of sending entity (e.g. a user, a process, an event, etc., on a client application or on the application server) of the web application, to any type of receiving entity.

In FIG. 2A, the steps performed for implementing the capability of publishing a communication event to be published is described. In FIG. 2B, the steps performed for implementing the capability of subscribing to a published communication event are described.

Turning to FIG. 2A, in Step 200, a trigger event that may initiate the sending of a communication event to be published is selected. A trigger event may be any detectable activity in the web application. For example, the trigger event may be a user providing input via a web page of the web application, displayed by a client application, such as the clicking of a button by a user. A trigger event may further be a state transition of the web application, observed, e.g., when a new page is being accessed. A trigger event may also be the initiation, execution or termination of a business rule being executed by the web application. In one embodiment of the technology, the selected trigger event is associated with the communication event to be published, such that the detection of the trigger event causes the execution of the method described in FIG. 5.

In Step 202, the name of the communication event to be published is specified. The name of the communication event may be a string selected by the application designer.

In one embodiment of the technology, the name, of the communication event to be published is globally unique, i.e., it uniquely identifies the communication event across multiple components of the system, including the application server, the client applications, etc.

In Step 204, the scope of the communication event to be published is set to "global". As previously described, a communication event may be similar to a user interface event, but unlike the user interface event, which has a limited scope (e.g. being valid on a certain web page only, or being valid within a particular client application only), the communication event's validity may extend to beyond the limited scope of a user interface element and may thus reach multiple components of the system, including client applications and the application server. The global scope of the communication event may make the communication event available to any component in the system and/or that is accessible via the system, where a subscribing recipient requests the receipt of communication events to be published.

In Step 206, the source for the payload of the communication event to be published is specified. In one or more embodiments of the technology, the source for the payload of the communication event provides content to be communicated by the communication event to be published (i.e., the payload). The source may be, for example, a user interface input element such as a textbox enabling a user to enter text. Alternatively, the source may be a component of the web application itself, for example, an output of a business rule, implemented by the web application. In one or more embodiments of the technology, any element of the web application, including the client applications and the application server, that process information may serve as a source, providing a payload of the communication event.

In Step 208, the type of the payload of the communication even to be published is specified. The type may inform the system of memory requirements and format of the payload to be communicated with the communication event to be published. Types of payloads supported by the web application may include strings of various lengths, numbers, including various representations such as integer and floating point representations, and heterogeneous and/or hierarchical data that may include combinations of data of different types In Step 210, the qualifier of the communication event to be published is specified. In one or more embodiments of the technology, the qualifier identifies requirements to be met by recipients of the communication event in order to be authorized to receive the communication event to be published. The qualifier may include, and may thus specify, types of qualified recipients and/or names of qualified recipients, as previously described. Specifying the qualifier of the communication event to be published is optional. The qualifier of the communication event to be published may alternatively be specified in Step 502 of FIG. 5.

Turning to FIG. 2B, in Step 250, a destination element is selected for the subscribed communication event. In one or more embodiments of the technology, the destination element is configured to obtain the subscribed communication event. The destination element may thus receive communication events to be published, as described below, with reference to FIGS. 3-6. The destination element, in accordance with one or more embodiments of the technology, is an element of the system to where the subscribed communication, when received, is provided. The destination element, in accordance with one or more embodiments of the technology, may be any element suitable for receiving subscribed communication events. For example, the destination element may be an output element of a client application's web page, used to display the payload (i.e. content) of the communication event to a user of the client application. Alternatively, the destination element may be a business rule of the web application, executed by a client application and/or the application server, or any other element of the system.

In Step 252, the name of the subscribed communication event is specified. Specifying the name of the subscribed communication event may enable the application designer to select a particular communication event, identified by the communication event's name, to be provided to the destination element selected in Step 250. In one or more embodiments of the technology, the subscribed communication event may be selected from a set of communication events available throughout the system. The subscribed communication event may be selected for example, by selecting a communication event from a list of user interface events shown to the application designer when configuring the destination element. The list of user interface events may include user interface events with a limited scope and communication events with a global scope. The list of user interface events may include a communication event generated as previously described in FIG. 2A. When selected by the name of the communication event to be published, the communication event to be published becomes a subscribed communication event.

Figure 3:
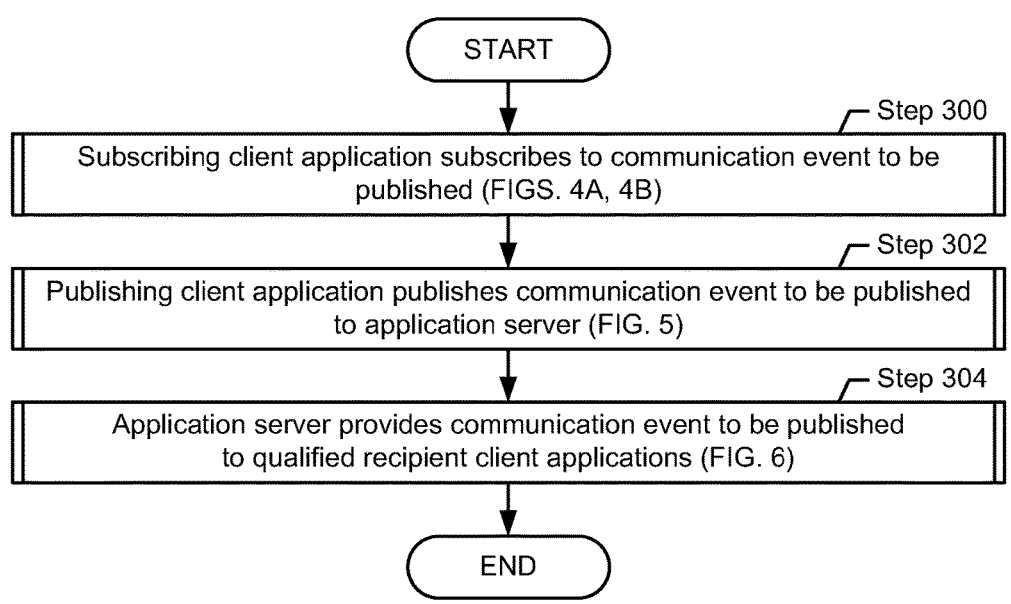

FIG. 3 shows methods for using a communication event (previously configured as described in FIGS. 2A and 2B) for exchanging information. The communication event may be used for the exchange of information between two users, accessing the system using different client applications, between a user and a component of the system, and between components of the system.

Turning to FIG. 3, in Step 300, a subscribing client application (or alternatively any other component of the system with the capability of subscribing to communication events) subscribes to a communication event to be published. Subscription to a communication event to be published enables the subscribing client application to receive the communication event to be published, when the communication event to be published is published. The details of Step 300 are described in FIGS. 4A and 4B.

In Step 302, the publishing client application (or alternatively, any other component of the system with the capability of publishing a communication event) publishes a communication event to be published. In one or more embodiments of the technology, the communication event to be published is provided to the application server of the system. The details of Step 302 are described in FIG. 5.

In Step 304, the application server provides the communication event to be published to qualified recipients of the communication event to be published. The details of Step 304 are described in FIG. 6.

Figure 4A:
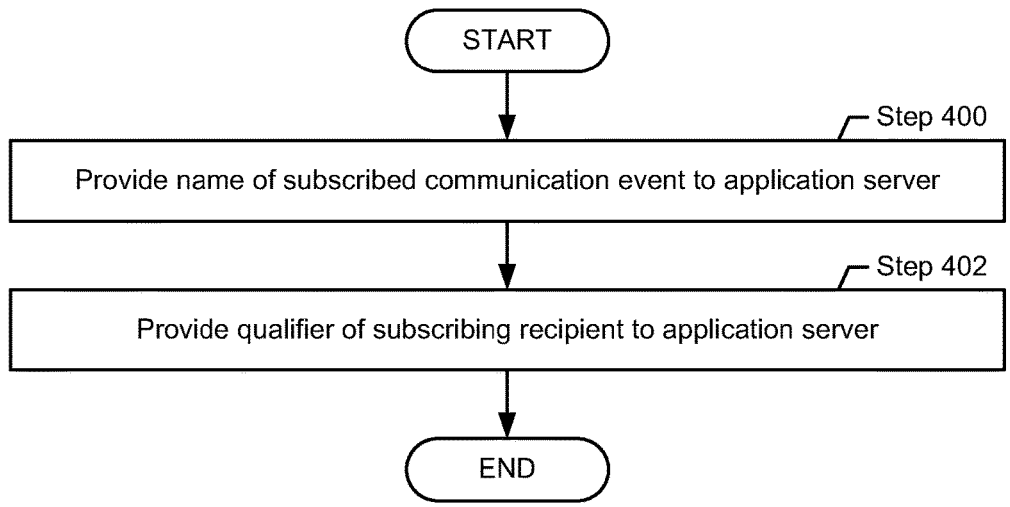
Figure 4B:
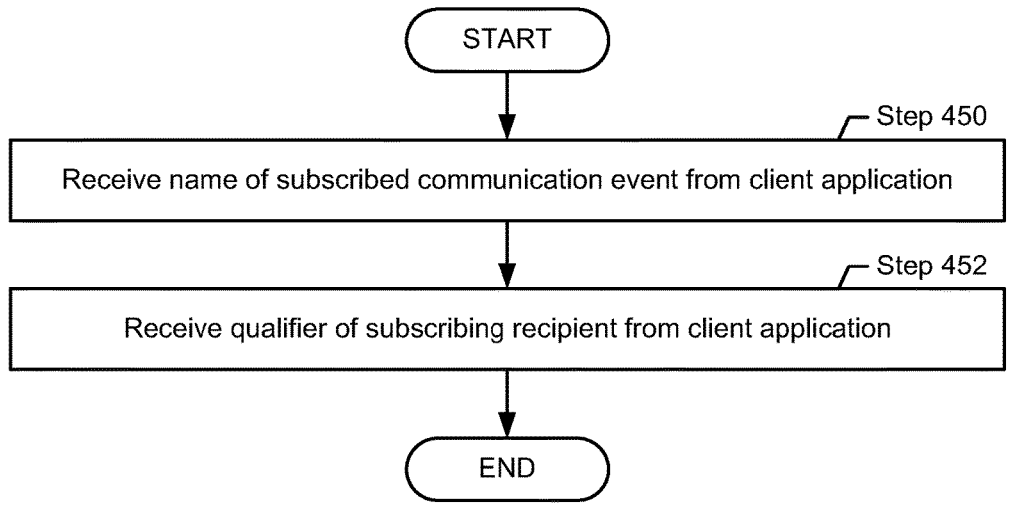

FIGS. 4A and 4B show methods for subscribing to a communication event. In FIG. 4A, the step performed by a subscriber are described. In FIG. 4B, the steps performed by the application server are described.

FIG. 4A shows a method for subscribing to a communication event, performed by a subscriber. A subscriber may be a client application, accessed by a user, or any other component of the system capable of performing the steps described in FIG. 4A. The method may be executed when a client application is started, when a particularly pages is accessed by a client application, or triggered by any other event specified by the application designer.

Turning to FIG. 4A, in Step 400, a subscriber provides the name of the subscribed communication event, initially specified in Step 252 of FIG. 2B, to the application server. The client application may perform Step 400 as a representative of the subscribing recipient. Consider, for example, a scenario where the subscribing recipient is a user accessing the web application via a client application. In this scenario, the client application would provide the name of the subscribed communication event, to the application server.

In Step 402, the subscribing recipient provides the qualifier of the subscribing recipient to the application server. In one or more embodiments of the technology, the qualifier of the subscribing recipient is provided to the application server by the client application that the subscribing recipient is accessing. The qualifier of the subscribing recipient may include a type of the subscribing recipient and/or a name of the subscribing recipient. As previously described, the type of subscribing recipient may be an identifier that may characterize the type of the subscribing recipient, and the name of the subscribing recipient may specify the identity of the subscribing recipient. In one embodiment of the technology, the type of the subscribing recipient may be context-dependent. For example, in a client application connected to the application server the subscriber to a particular communication event may be of the type "user", if the request for subscribing to a communication event is triggered by the actions of a user, or it may be of the type "page", if the request is triggered by a business rule executed by the client application. Similarly, the name of the subscribing recipient may also be context-dependent. For example, the name of the subscribing recipient may be "Peter" if Peter is the user triggering the request for subscribing to the communication event, and the name of the subscribing recipient may be "weekly_sales_totals" if the business rule "weekly_sales_totals" triggers the request for subscribing to the communication event.

FIG. 4B shows a method for subscribing to a communication event, performed by the application server receiving a subscription request. In one or more embodiments of the technology, the Steps 450 and 452 are the application server-sided counterparts of Steps 400 and 402, shown in FIG. 4A.

Turning to FIG. 4B, in Step 450, the application server receives the name of the subscribed communication event from the subscribing recipient. The application server may store the received name of the subscribed communication event in an event database, as previously described with reference to FIG. 1C.

In Step 452, the application server receives the qualifier of the subscribing recipient from the subscribing recipient. The qualifier, in accordance with one or more embodiments of the technology, may include the type of the subscribing recipient and/or the name of the subscribing recipient. The application server may store the received qualifier of the subscribing recipient, including the type of the subscribing recipient and/or the name of the subscribing recipient in an event database, as previously described with reference to FIG. 1C.

Figure 5:
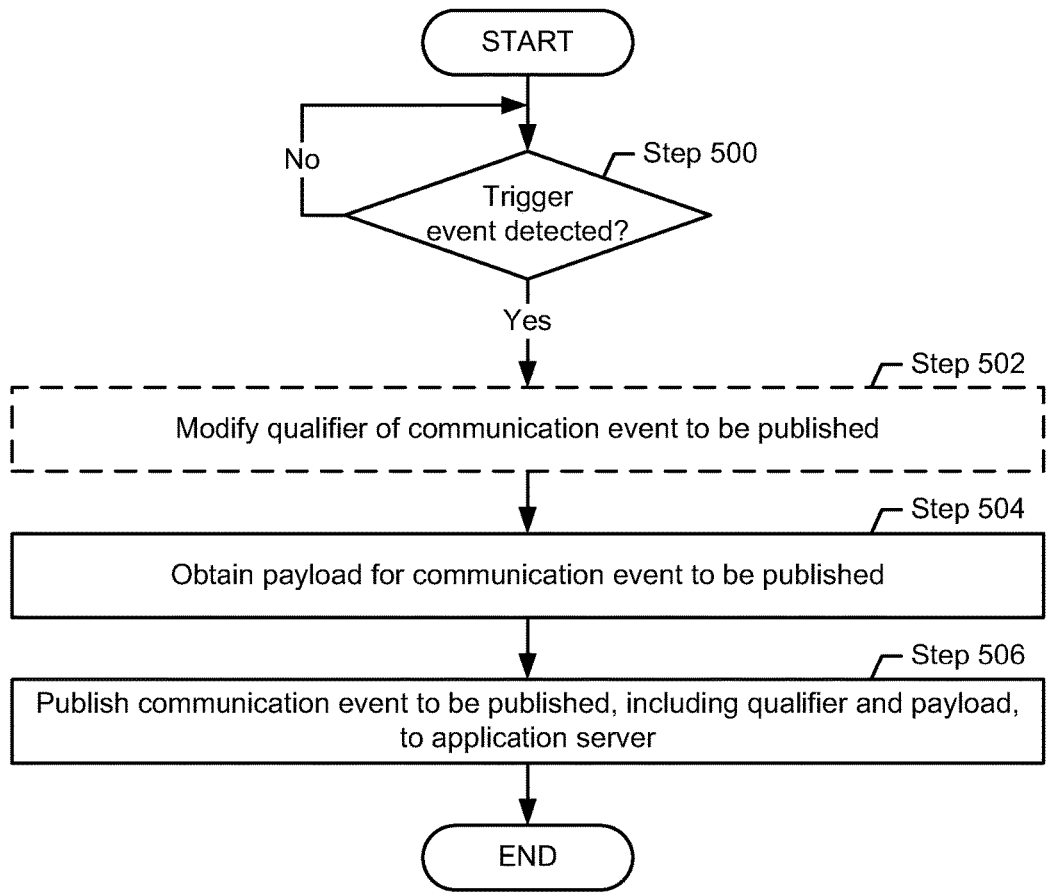

FIG. 5 shows a method for publishing a communication event. In one or more embodiments of the technology, the communication event may be published by a client application, or by any other component of the system, for which the steps described in FIGS. 2A and 2B have been performed, and that is capable of performing the steps described in FIG. 5. The steps may be performed each time a communication event is published.

Turning to FIG. 5, in Step 500, a determination is made about whether a trigger event, previously defined in Step 200 of FIG. 2A, is detected. As previously described, the trigger event may be, for example, a user clicking a button in the user interface of a client application or any other event specified as a trigger event in Step 200. If no trigger event is detected, the method may remain in Step 500. If a determination is made that a trigger even has occurred, the method may proceed to Step 502.

In Step 502, the qualifier of the communication event to be published may be modified or newly specified if no qualifier has been specified in Step 210 of FIG. 2A. Consider, for example, a scenario where the communication event is used for implementing a chat functionality enabling users of different client applications to exchange messages. In such a scenario, the qualifier of the communication event to be published identifies the recipient of a chat message. If the user of the chat functionality is allowed to choose the recipient of the chat message, the qualifier may therefore not be specified in Step 210. Instead, the qualifier may be specified in Step 502 by a user specifying the recipient of the chat message.

In Step 504, the payload for the communication event to be published is obtained. The payload may be obtained from the source of the payload, previously specified in Step 206 of FIG. 2. As previously described, the source of the payload may be, for example, a user interface input element such as a text box, or any other element of the web application defined in Step 206 as a source of the payload.

In Step 506, the communication event to be published is published, i.e., it is sent to the application server. The communication event to be published, in accordance with an embodiment of the technology, may include the qualifier specified in Step 210 or in Step 502, and the payload, obtained in Step 504. The communication event to be published may be sent to the application server using any communication protocol suitable for transporting the communication event between the computing device executing the client application and the application server via a network connection. In one embodiment of the technology, the WebSocket protocol is used by the client application to publish the communication event to the application server.

Figure 6:
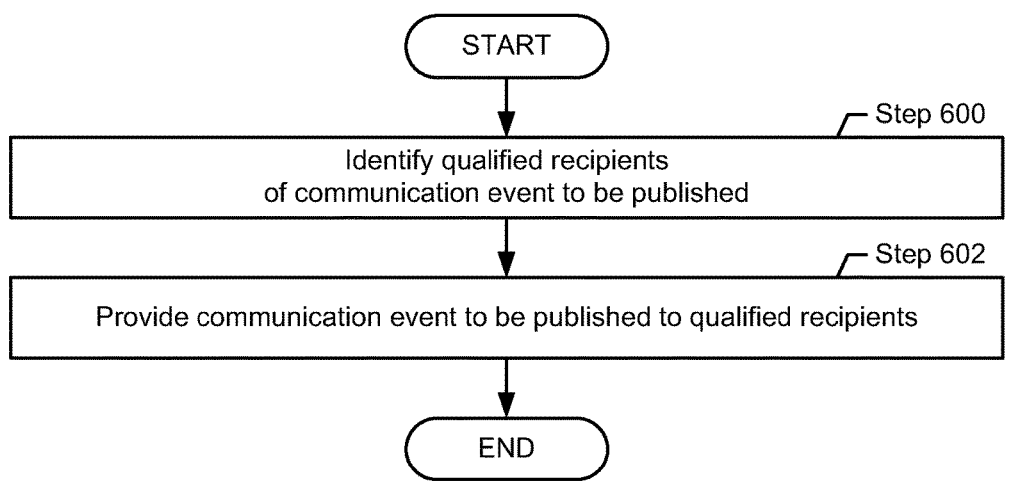

FIG. 6 shows a method for providing a communication event to be published, received by the application server as described with reference to FIG. 5, to qualified recipients of the communication event to be published. The communication event may be published by a client application, or by any other component of the system, for which the steps described in FIGS. 2A and 2B have been performed, and that is capable of performing the steps described in FIG. 5. The steps may be performed each time a communication event is published.

Turning to FIG. 6, in Step 600, qualified recipients of the communication event to be published are identified. In one or more embodiments of the technology, the qualified recipients are identified in a two-step matching process. In the first step, the name of the communication event to be published, received by the application server, is matched with the names of the subscribed communication events. The matching may be performed by the application server. The application server, in accordance with an embodiment of the technology, compares the name of the communication event to be published with the names of the subscribed communication events, stored, for example, in an event database. The subscribed communication event with the name matching the name of the published communication event may be selected In the second step, qualifiers of subscribing recipients, grouped under the selected name of the subscribed communication event, are matched with the qualifier of the communication event to be published.

If a qualifier of a subscribing recipient is determined to match the qualifier of the communication event to be published, the subscribing recipient may be considered to be qualified to receive the communication event to be published.

In Step 602, the communication event to be published is provided to the qualified recipients of the communication event to be published. The application server may, for example, send the communication event to be published to the client application accessed by the user identified in Step 600 as a qualified recipient. Upon receipt of the communication event to be published, the client application may then provide the communication event to be published to the destination element for the subscribed communication event. For example, the web application may forward the payload of the communication event to be published to an output element of the client application web page, e.g., a text box, if the payload is a text message.

The communication event to be published may be sent to the client application using any communication protocol suitable for transporting the communication event including the payload from the application server to the computing device executing the client application, via a network connection. In one embodiment of the technology, the WebSocket protocol is used by the application server to provide the communication event to the client application.

Embodiments of the technology may enable a system, including client applications connected to an application server, to exchange communication events in a device-independent manner. Communication events, in accordance with one or more embodiments of the technology, are not limited to providing a particular fixed communication channel (like a chat or a status update), but may rather be universally available to satisfy various communication needs between client applications and/or other components of the system. The purpose of a particular communication event may be determined by the configuration of the communication event, by the input provided to the communication event, and by the configuration of the receiving side of the communication event. For example a similar communication event may be used for providing a chat functionality to users, and for enabling the logging of login attempts of users accessing client applications. In case of the chat functionality, the communication event may obtain a message to be communicated from a user entering the message and may deliver the message to another user, whereas in case of the logging functionality, the communication event may obtain a date of a login attempt from a monitoring process of the client application and may deliver the date of the login attempt to an archiving process of the application server. As illustrated by these non-limiting examples, communication events thus support a broad range of communication tasks between users and/or components of a system. In one or more embodiments of the technology, communication events may thus carry various types of payloads. Further, if desired, communication activity via communication events may be logged by the application server.

In one or more embodiments of the technology, the communication events may be exchanged in real-time or near-real-time. The underlying publication-subscription paradigm may enable the exchange of communication events in real-time, while avoiding web traffic intense polling that may cause server-overloading.

The communication events in accordance with one or more embodiments of the technology may be provided to a configurable audience (i.e., qualified recipients), ranging from a single recipient to all users of the system. Qualified recipients may be identified by their names and/or by characteristics (i.e., the type) of the recipients. In one or more embodiments of the technology, communication events may also be used for communication between components of the systems rather than between users only.

Embodiments of the technology enable an application designer to implement the communication functionality based on user interface events that are graphically programmed and that are also used for implementing other functionalities of the system, including business rules. The application designer may therefore already be familiar with these universally usable user interface events without having to study their function and implementation.

Figure 7:
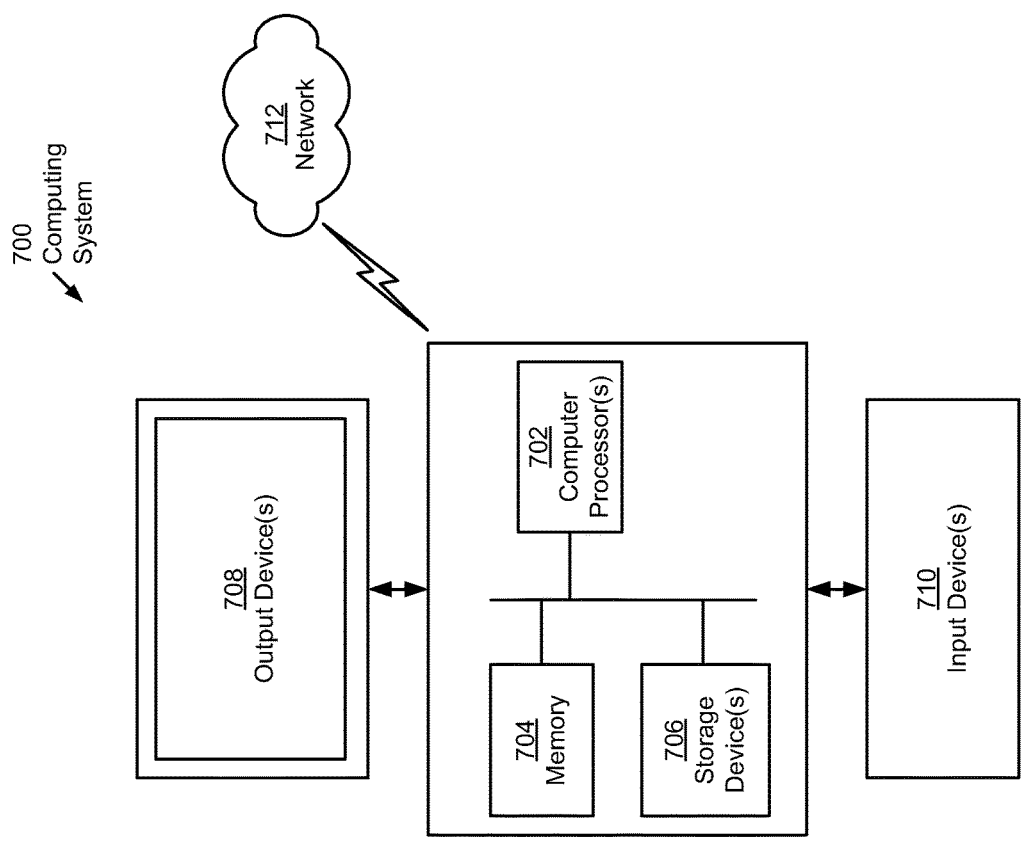
FIG. 7 shows a computing system in accordance with one or more embodiments of the technology.

Embodiments of the technology may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (700) may be located at a remote location and connected to the other elements over a network (712). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for web applications to communicate using published events, comprising:
    implementing a communication event to be published in a web application, comprising:
        specifying a name of the communication event to be published; and
        specifying a qualifier of the communication event to be published, wherein the qualifier of the communication event to be published is a type of a qualified recipient of the communication event to be published;
    implementing a subscribed communication event in the web application, comprising:
        specifying a name of the subscribed communication event, wherein the name of the subscribed communication event is identical to the name of the communication event to be published;
    after implementing the communication event to be published and the subscribed communication event:
        obtaining, from a subscribing recipient of the web application, a communication event subscription request, wherein the communication event subscription request comprises a type of the subscribing recipient and a name of the subscribed communication event;
        obtaining, from a publishing client application, the communication event to be published, wherein the communication event to be published comprises the name of the communication event to be published and the qualifier of the communication event to be published;
        identifying a first match between the name of the subscribed communication event and the name of the communication event to be published;
        identifying a second match between the type of the subscribing recipient and the qualifier of the communication event to be published;
        making a determination, based on the first match and the second match, that the subscribing recipient is the qualified recipient of the communication event to be published; and
        providing, based on the determination, the communication event to be published to the subscribing recipient via a receiving element.

2. The method of claim 1, wherein the subscribing recipient is a user accessing the web application via a subscribing client application of the web application.

3. The method of claim 1, wherein the receiving element is an output element in a web page of an client application of the web application, accessed by a user.

4. The method of claim 1, wherein the communication event to be published further comprises a payload.

5. The method of claim 4, wherein the payload comprises at least one selected from the group consisting of a string and a number.

6. The method of claim 1, wherein the type of the qualified recipient of the communication event to be published is at least one selected from the group consisting of at least one user, at least one role, at least one web page, at least one business rule, at least one location, at least one data service, and a chat widget.

7. The method of claim 1, wherein the communication event to be published is a user interface event with a global scope.

8. The method of claim 1, wherein implementing the communication event to be published in the web application is performed in a graphical design environment of a web application developer tool.

9. A non-transitory computer readable medium (CRM) storing instructions for web applications to communicate using published events, the instructions comprising functionality for:
    implementing a communication event to be published in a web application, comprising:
        specifying a name of the communication event to be published; and
        specifying a qualifier of the communication event to be published, wherein the qualifier of the communication event to be published is a type of a qualified recipient of the communication event to be published;
    implementing a subscribed communication event in the web application, comprising:
        specifying a name of the subscribed communication event, wherein the name of the subscribed communication event is identical to the name of the communication event to be published;
    after implementing the communication event to be published and the subscribed communication event:
        obtaining, from a subscribing recipient of the web application, a communication event subscription request, wherein the communication event subscription request comprises a type of the subscribing recipient and a name of the subscribed communication event;
        obtaining, from a publishing client application, the communication event to be published, wherein the communication event to be published comprises the name of the communication event to be published and the qualifier of the communication event to be published;
        identifying a first match between the name of the subscribed communication event and the name of the communication event to be published;
        identifying a second match between the type of the subscribing recipient and the qualifier of the communication event to be published;
        making a determination, based on the first match and the second match, that the subscribing recipient is the qualified recipient of the communication event to be published; and
        providing, based on the determination, the communication event to be published to the subscribing recipient via a receiving element.

10. The non-transitory CRM of claim 9, wherein the communication event to be published further comprises a payload.

11. The non-transitory CRM of claim 10, wherein the payload comprises at least one selected from the group consisting of a string and a number.

12. The non-transitory CRM of claim 9, wherein the type of the qualified recipient of the communication event to be published is at least one selected from the group consisting of at least one user, at least one role, at least one web page, at least one business rule, at least one location, at least one data service, and a chat widget.

13. The non-transitory CRM of claim 9, wherein the communication event to be published is a user interface event with a global scope.

14. A system for web applications to communicate using published events, comprising:
a computing device comprising a computer processor;
an application server, executing on the computer processor, and configured to:
obtain an implementation of a communication event to be published in a web application, comprising:
a name of the communication event to be published; and
a qualifier of the communication event to be published, wherein the qualifier of the communication event to be published is a type of a qualified recipient of the communication event to be published;
obtain an implementation of a subscribed communication event in the web application, comprising:
a name of the subscribed communication event, wherein the name of the subscribed communication event is identical to the name of the communication event to be published;
after obtaining the implementation of the communication event to be published and the subscribed communication event:
obtain, from a subscribing recipient of the web application, a communication event subscription request, wherein the communication event subscription request comprises a type of the subscribing recipient and a name of the subscribed communication event;
obtain, from a publishing client application, the communication event to be published, wherein the communication event to be published comprises the name of the communication event to be published and the qualifier of the communication event to be published;
identify a first match between the name of the subscribed communication event and the name of the communication event to be published;
identify a second match between the type of the subscribing recipient and the qualifier of the communication event to be published;
make a determination, based on the first match and the second match, that the subscribing recipient is the qualified recipient of the communication event to be published; and
provide, based on the determination, the communication event to be published to the subscribing recipient via a receiving element.

15. The system of claim 14, wherein the communication event to be published further comprises a payload.

16. The system of claim 14, wherein the type of the qualified recipient of the communication event to be published is at least one selected from the group consisting of at least one user, at least one role, at least one web page, at least one business rule, at least one location, at least one data service, and a chat widget.

17. The system of claim 14, wherein the communication event to be published is a user interface event with a global scope.

* * * * *